(12) United States Patent
Kimura et al.

(10) Patent No.: US 10,804,720 B2
(45) Date of Patent: Oct. 13, 2020

(54) BATTERY CHARGING APPARATUS AND RECORDING APPARATUS

(71) Applicant: SEIKO EPSON CORPORATION, Tokyo (JP)

(72) Inventors: Takumi Kimura, Fukuoka (JP); Ryohei Horita, Nagano (JP); Yuko Hirayama, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/877,668

(22) Filed: Jan. 23, 2018

(65) Prior Publication Data

US 2018/0241233 A1 Aug. 23, 2018

(30) Foreign Application Priority Data

Feb. 20, 2017 (JP) .................................. 2017-029190

(51) Int. Cl.
| | |
|---|---|
| *H02J 7/00* | (2006.01) |
| *B41J 29/38* | (2006.01) |
| *B41J 29/393* | (2006.01) |
| *B41J 29/13* | (2006.01) |
| *H02J 7/04* | (2006.01) |
| *H02J 7/02* | (2016.01) |
| *H01M 10/42* | (2006.01) |

(52) U.S. Cl.
CPC ............. *H02J 7/0047* (2013.01); *B41J 29/13* (2013.01); *B41J 29/38* (2013.01); *B41J 29/393* (2013.01); *H02J 7/00* (2013.01); *H02J 7/0071* (2020.01); *H02J 7/045* (2013.01); *H01M 10/4257* (2013.01); *H02J 7/0044* (2013.01); *H02J 7/0048* (2020.01); *H02J 7/027* (2013.01)

(58) Field of Classification Search
USPC ................................................... 320/DIG. 21
See application file for complete search history.

(56) References Cited

U.S. PATENT DOCUMENTS

| | | | | |
|---|---|---|---|---|
| 4,583,034 | A * | 4/1986 | Martin .................. | H02J 7/0078 320/134 |
| 5,341,084 | A * | 8/1994 | Gotoh ................ | G01R 31/3648 324/427 |
| 6,157,169 | A * | 12/2000 | Lee .................. | G01R 19/16542 320/132 |
| 6,326,767 | B1 * | 12/2001 | Small .................. | H01M 2/1055 320/116 |

(Continued)

FOREIGN PATENT DOCUMENTS

| | | |
|---|---|---|
| JP | 11-289685 A | 10/1999 |
| JP | 2006-238598 A | 9/2006 |

(Continued)

*Primary Examiner* — Samuel Berhanu
(74) *Attorney, Agent, or Firm* — Global IP Counselors, LLP (57) ABSTRACT

A battery charging apparatus that acquires a remaining battery charge amount by detecting a battery voltage after charging of a battery by a charging circuit has been temporarily stopped and a given wait time has elapsed, wherein, regardless of the temporary stopping of charging by the charging circuit, a charging display control unit that controls display of a charging displaying section causes the charging displaying section to display that charging control is being performed while charging control is being performed.

11 Claims, 6 Drawing Sheets

(56) References Cited

U.S. PATENT DOCUMENTS

| | | | |
|---|---|---|---|
| 6,495,989 B1 | 12/2002 | Eguchi | |
| 9,841,462 B2* | 12/2017 | Kim | G06F 1/305 |
| 2004/0196006 A1* | 10/2004 | Kawaguchi | H02J 7/0004 |
| | | | 320/132 |
| 2005/0099161 A1* | 5/2005 | Sato | H02J 7/0047 |
| | | | 320/134 |
| 2008/0054845 A1* | 3/2008 | Wang | H02J 7/0042 |
| | | | 320/111 |
| 2009/0154076 A1* | 6/2009 | Beak | F16M 11/105 |
| | | | 361/679.01 |
| 2009/0256521 A1* | 10/2009 | Mori | H02J 7/0047 |
| | | | 320/108 |
| 2010/0156343 A1* | 6/2010 | Jung | H02J 7/025 |
| | | | 320/108 |
| 2014/0055084 A1* | 2/2014 | Ishikawa | H02J 7/0029 |
| | | | 320/107 |
| 2016/0111903 A1* | 4/2016 | Miller | H02J 2207/40 |
| | | | 362/183 |
| 2016/0301217 A1* | 10/2016 | Zeine | H02J 50/40 |
| 2018/0260887 A1* | 9/2018 | Takatsuka | B60L 11/1825 |

FOREIGN PATENT DOCUMENTS

| | | |
|---|---|---|
| JP | 4186092 B2 | 11/2008 |
| JP | 2012-075260 A | 4/2012 |

* cited by examiner

| CHARGING STATUS | APPARATUS STATE | REMAINING BATTERY CHARGE AMOUNT DISPLAY |
|---|---|---|
| BATTERY BEING DRIVEN | IN OPERATION | CONSISTENT IN DECREASING DIRECTION |
| | AT REST | CONSISTENT IN DECREASING DIRECTION |
| AC ADAPTER CONNECTED | IN OPERATION | CONSISTENT IN INCREASING DIRECTION |
| | AT REST | CONSISTENT IN INCREASING DIRECTION |

FIG. 6

| REMAINING BATTERY CHARGE AMOUNT (%) | PREDICTED VALUE OF TIME NECESSARY FOR FULL CHARGE (MIN) |
|---|---|
| 0 | 190 |
| 1 | 189 |
| 2 | 188 |
| ⋮ | ... |
| 50 | 165 |
| ⋮ | ... |
| 60 | 160 |
| ⋮ | ... |
| 98 | 20 |
| 99 | 10 |

BATTERY CHARGING APPARATUS AND RECORDING APPARATUS

BACKGROUND

1. Technical Field

The present invention relates to a battery charging apparatus that charges a battery. The present invention also relates to a recording apparatus that performs recording on a medium.

2. Related Art

In many electronic apparatuses, particularly portable ones, rechargeable batteries (secondary batteries) are mounted. In many of such electronic apparatuses, a charging control device that controls charging of a battery is mounted, and, in consideration of the convenience of users, a displaying section that displays a remaining battery charge amount is further provided.

There are some methods to determine a remaining battery charge amount. One of the methods is to calculate a remaining battery charge amount by using a terminal voltage of the battery. However, the terminal voltage of a battery easily varies, sometimes resulting in a failure to obtain an accurate remaining battery charge amount.

As means for solving such a problem, by way of example, Japanese Patent No. 4186092 discloses a battery apparatus that detects a terminal voltage of a battery after a period during which current does not flow in the battery or a period during which little current flows in the battery has continued for a given time, that is, after a time sufficient for the terminal voltage of the battery to be constant has elapsed.

An electronic apparatus in which a rechargeable battery is mounted is typically provided with an indicator for indicating a charging status (whether the battery is being charged). The indicator includes, for example, light emitting diodes (LEDs) and a liquid crystal display.

However, in the situation where the indicator is linked with a charging circuit, if a wait time for causing the terminal voltage of the battery to be constant is set in charging control as described above, the status of the indicator frequently changes, which is not desirable.

In existing electronic apparatuses, such an aspect is not taken into consideration. In addition, if a wait time for causing the terminal voltage of the battery to be constant is set in charging control as described above, a problem arises in that the charging time is increased more than necessary.

SUMMARY

A first advantage of some aspects of the invention is that a charging status is more suitably displayed while a remaining battery charge amount is more accurately displayed.

In addition, a second advantage of some aspects of the invention is that, in addition to the above first advantage, an unnecessary increase in charging time is suppressed.

Furthermore, a third advantage of some aspects of the invention is that, in addition to the above first advantage, the time necessary for charging is predicted more accurately.

A battery charging apparatus according to an aspect of the invention includes a charging circuit that charges a battery, a remaining charge amount displaying section that displays a remaining battery charge amount, a charging displaying section that displays whether at least charging control is being performed, a remaining charge amount acquiring unit that acquires a remaining battery charge amount to be displayed on the remaining charge amount displaying section in accordance with a battery voltage, and a charging display control unit that controls display of the charging displaying section. In the battery charging apparatus, the remaining charge amount acquiring unit acquires the remaining battery charge amount by detecting the battery voltage after charging of the battery by the charging circuit has been temporarily stopped and a given wait time has elapsed, and, regardless of the temporary stopping of charging by the charging circuit, the charging display control unit causes the charging displaying section to display that charging control is being performed while charging control is being performed.

In this case, the remaining charge amount acquiring unit acquires a remaining battery charge amount by detecting a battery voltage after charging of the battery by the charging circuit has been temporarily stopped and a given wait time has elapsed, that is, a battery voltage value in a more stable state is acquired, and therefore a remaining battery charge amount may be more accurately acquired.

Since the charging display control unit, which controls display on the charging displaying section, causes the charging displaying section to display that charging control is being performed, regardless of the temporary stopping of charging by the charging circuit, while charging control is being performed, suitable charging status display, which does not lead to frequent changes in the status of the charging display section, may be performed.

Note that, as used herein, the term "charging control" has a different meaning than the term "charging" of the battery by the charging circuit and means a series of control operations, from start of charging to completion of charging, including charging of the battery by the charging circuit and the temporary stopping of charging.

In the battery charging apparatus, the lower the battery voltage, the shorter a time interval in which information of the remaining charge amount displaying section is updated may be set.

In this case, since the lower the battery voltage, the shorter the time interval in which information of the remaining charge amount displaying section is updated may be set, the remaining battery charge amount is finely updated in the condition where the remaining battery charge amount largely varies. This may serve the convenience of the user.

Note that "the lower the battery voltage" does not mean the absolute value of a battery voltage but means a relative relationship between battery voltages. For example, when there are some battery voltage (referring to as a first voltage) and a battery voltage (referring to as a second voltage) having a relatively lower voltage than the first voltage, the time interval at the second voltage is shorter than the time interval at the first voltage.

In the battery charging apparatus, the charging displaying section may be capable of performing a power saving mode in which display of at least a remaining battery charge amount is turned off, and the remaining charge amount acquiring unit may not provide the wait time or may set the wait time to be shorter than when the power saving mode is deactivated, while the power saving mode is being performed.

In this case, since the charging displaying section may be capable of performing a power saving mode in which display of at least a remaining battery charge amount is turned off, and the remaining charge amount acquiring unit may not provide the wait time or may set the wait time to be shorter than when the power saving mode is deactivated, while the power saving mode is being performed, the wait time is not provided when the remaining battery charge amount need not be displayed (that is, in the case of the power saving mode). This may suppress an unnecessary increase in charging time.

In the battery charging apparatus, the remaining charge amount acquiring unit may not provide the wait time when the battery voltage exceeds a given value.

The higher the battery voltage, the smaller charging current is needed, and therefore the time necessary for voltage to be constant after charging stops is short. Accordingly, since the remaining charge amount acquiring unit may not provide the wait time when the battery voltage exceeds the given value, an unnecessary increase in charging time may be suppressed.

The battery charging apparatus may further include a remaining charge amount displaying control unit that controls the remaining charge amount displaying section in accordance with a remaining battery charge amount acquired by the remaining charge amount acquiring unit, and, in the battery charging apparatus, the remaining charge amount displaying control unit may cause a remaining battery charge amount displayed on the remaining charge amount displaying section to be consistently in either an increasing direction or a decreasing direction in accordance with an apparatus state, regardless of the remaining battery charge amount acquired by the remaining charge amount acquiring unit.

For example, during operation of the apparatus, that is, during discharging of the battery, the battery voltage drops because of the influence of discharging, and after the operation of the apparatus stops, that is, when the battery discharging is complete, the battery voltage rises. Accordingly, when a remaining battery charge amount is acquired during discharging of the battery and is displayed, and a remaining battery charge amount is then acquired after discharging of the battery and is displayed, there is an increase in the displayed remaining battery charge amount because of a temporary voltage variation despite the state where the battery is not charged. This is not intuitive to the user.

In this case, the remaining charge amount displaying control unit, which controls the remaining charge amount displaying section in accordance with a remaining battery charge amount acquired by the remaining charge amount acquiring unit, may cause the display of a remaining battery charge amount on the remaining charge amount displaying section to be consistently in either an increasing direction or a decreasing direction in accordance with the apparatus state, regardless of the remaining battery charge amount acquired by the remaining charge amount acquiring unit. This may suppress unnatural display of an increase or decrease in remaining battery charge amount contrary to the apparatus state as described above to provide a natural display of a remaining battery charge amount.

The battery charging apparatus may further include a measuring unit that measures an actual charging time taken for increasing a remaining battery charge amount by a given amount, and an information writing unit that writes information regarding the actual charging time to an information storage section included in the battery.

The predicted time for completion of charging that is calculated based on battery specifications sometimes differs from a time actually taken for charging of a battery because of individual variations among batteries. It is conceivable to correct the predicted time for completion of charging by using the time actually taken for charging. However, such correction is not capable of dealing with a usage situation where, for example, a plurality of batteries are prepared and are used alternately.

In this case, since the battery charging apparatus may further include the measuring unit that measures an actual charging time taken for increasing a remaining battery charge amount by a given amount and the information writing unit that writes information regarding the actual charging time to the information storage section included in the battery, even when a battery is replaced, the necessary time for charging for the replaced battery is acquired from the memory 25. This may provide a more accurate necessary time for charging (predicted time) adaptive for an individual battery to the user.

A recording apparatus according to another aspect includes a recording unit that performs recording on a medium and the battery charging apparatus according to the aspect.

In this case, the recording apparatus achieves the same advantages as the battery charging apparatus described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings. The invention is not limited to the embodiment described below and various modifications may be made within the spirit of the invention and the scope of the appended claims. Assuming that the modifications are also within the scope of the invention, an embodiment of the invention will be described below.

Figure 1:
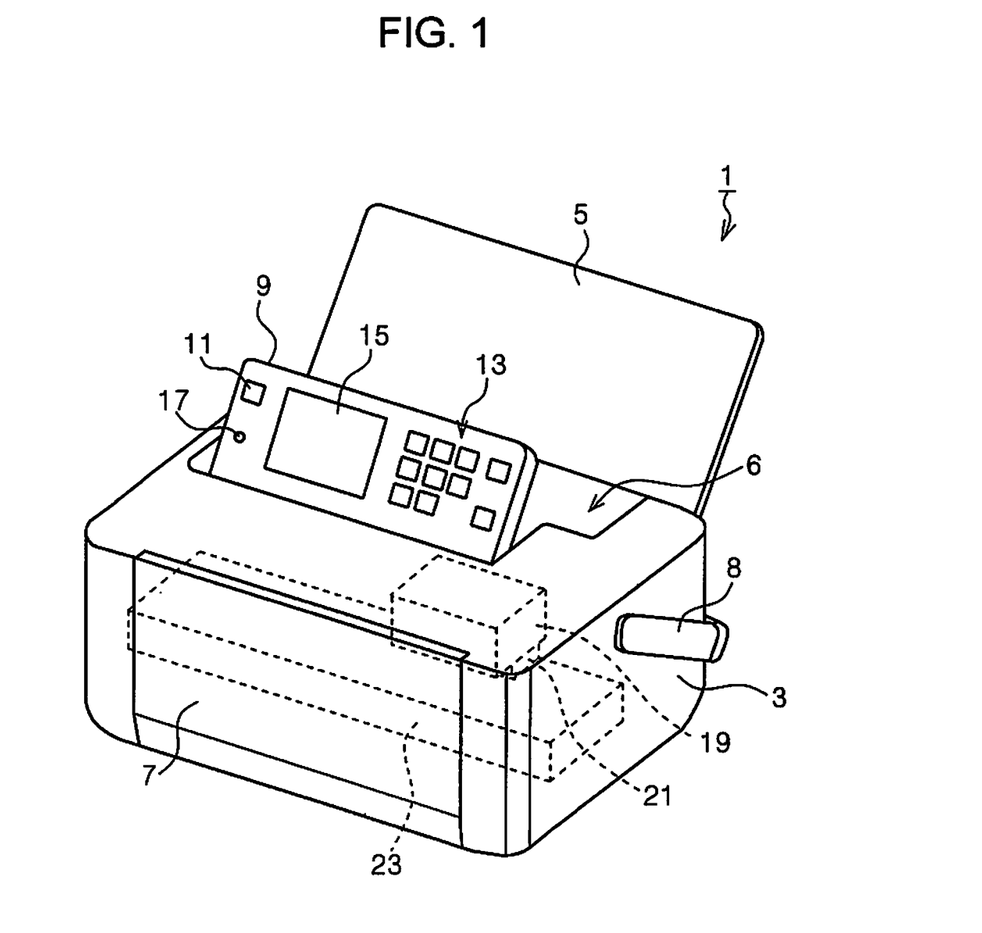
FIG. 1 is an external perspective view of a printer according to the invention.
Figure 2:
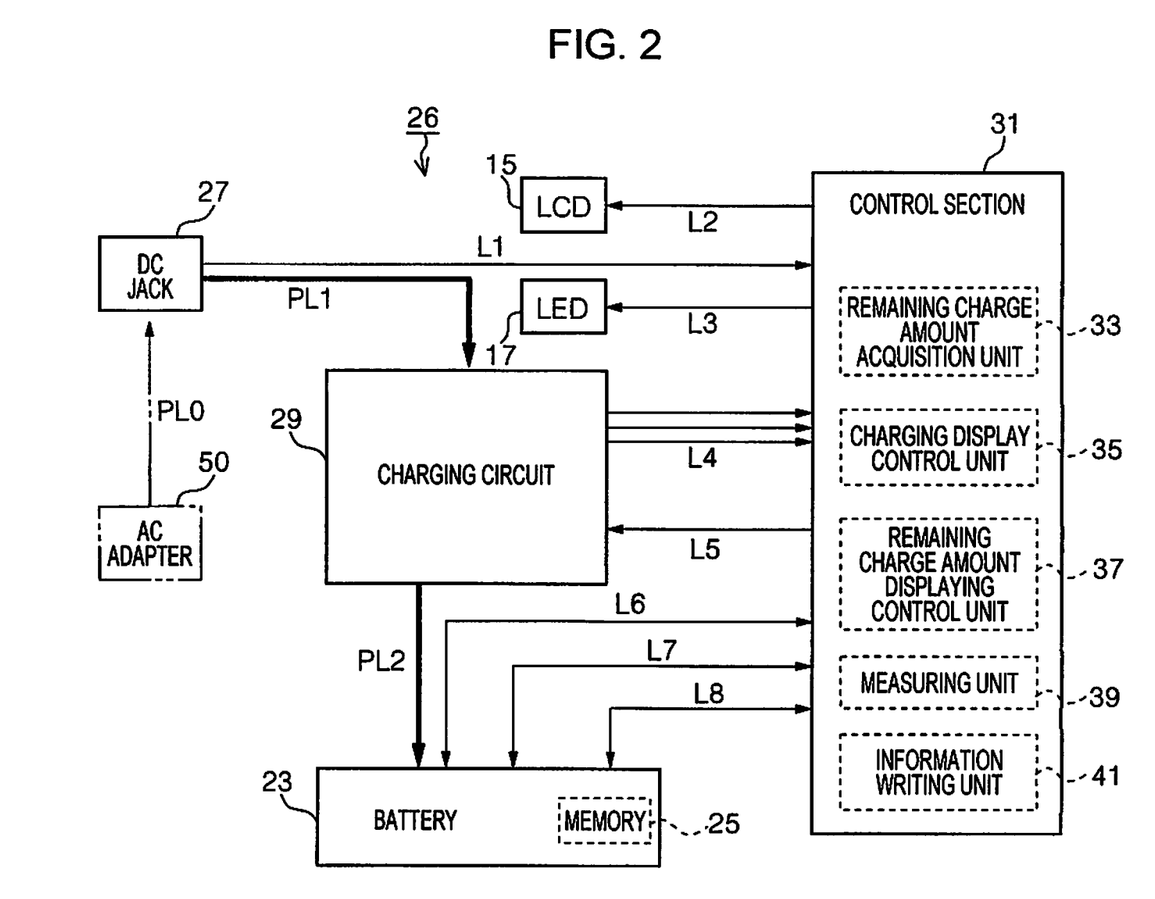
FIG. 2 is a block diagram illustrating a configuration of a battery charging apparatus according to the invention.
Figure 3:
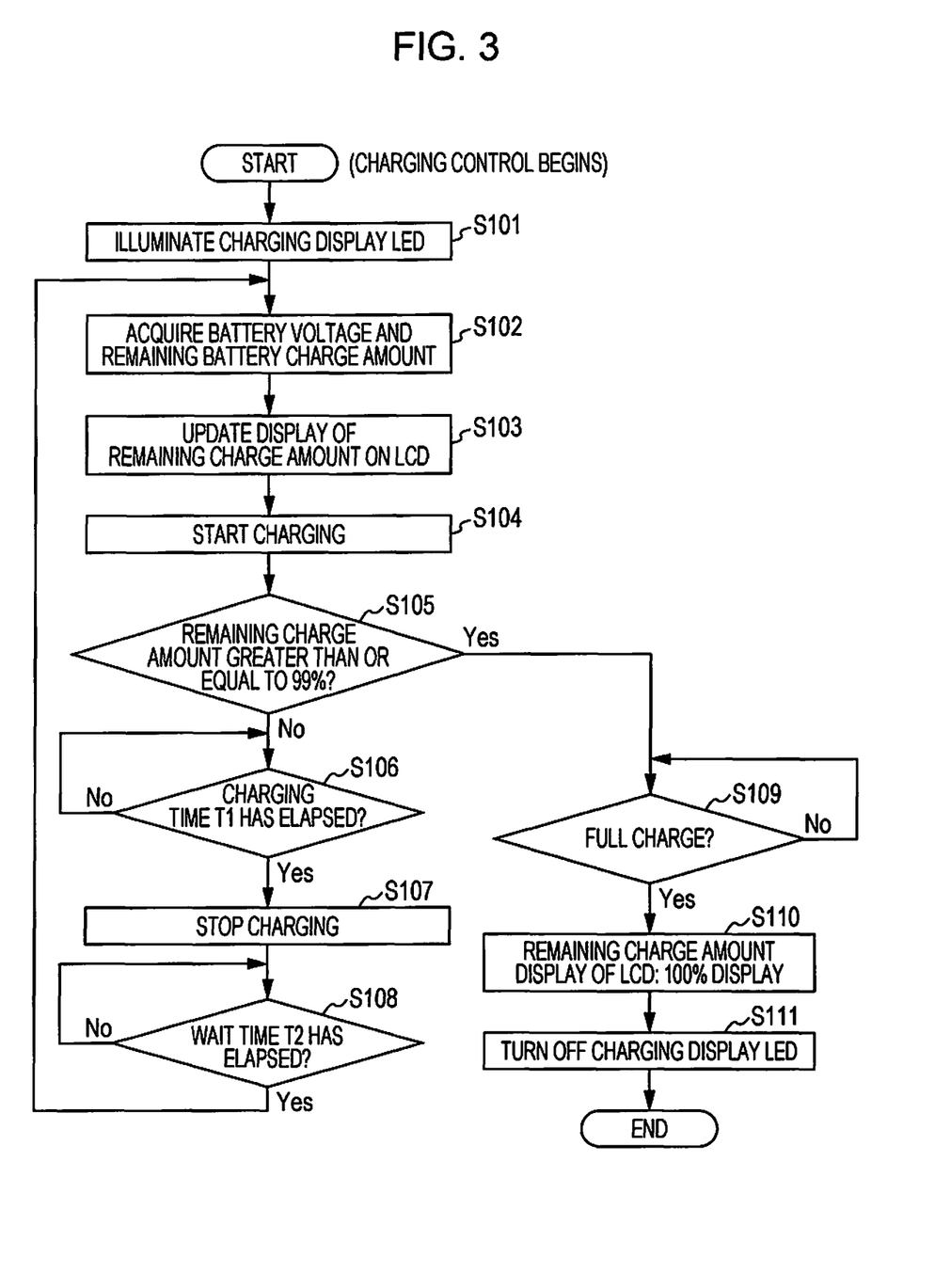
FIG. 3 is a flowchart illustrating a flow of charging control performed by a battery charging apparatus according to the invention.
Figure 4:
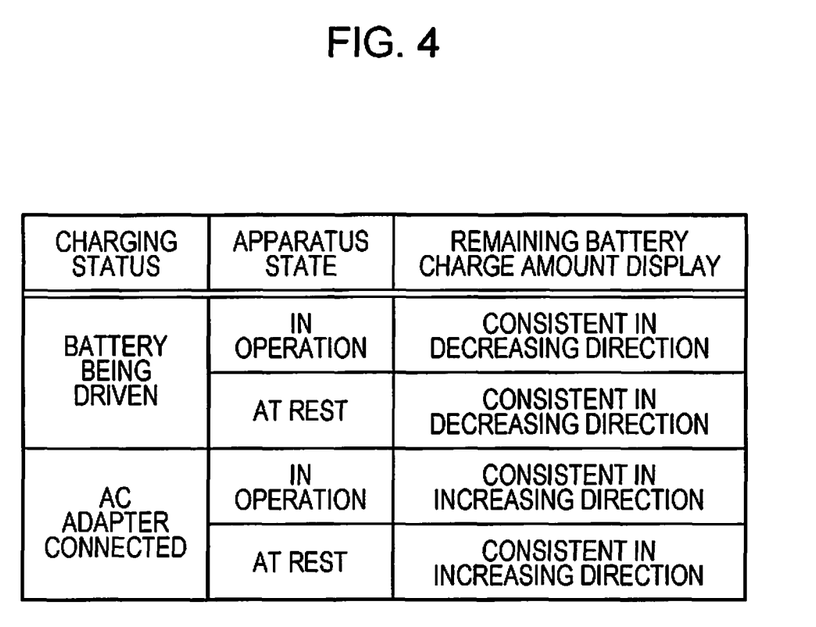
FIG. 4 is a chart illustrating content of direction control for charging display.

FIG. 1 is an external perspective view of an ink jet printer (hereinafter referred to as a printer) 1 as an embodiment of a "recording apparatus" according to the invention, FIG. 2 is a block diagram illustrating a configuration of a battery charging apparatus 26 according to the invention included in the printer 1, FIG. 3 is a flowchart illustrating a flow of charging control performed by the battery charging apparatus 26, and FIG. 4 is a chart illustrating content of direction control for charging display.

Figure 5:
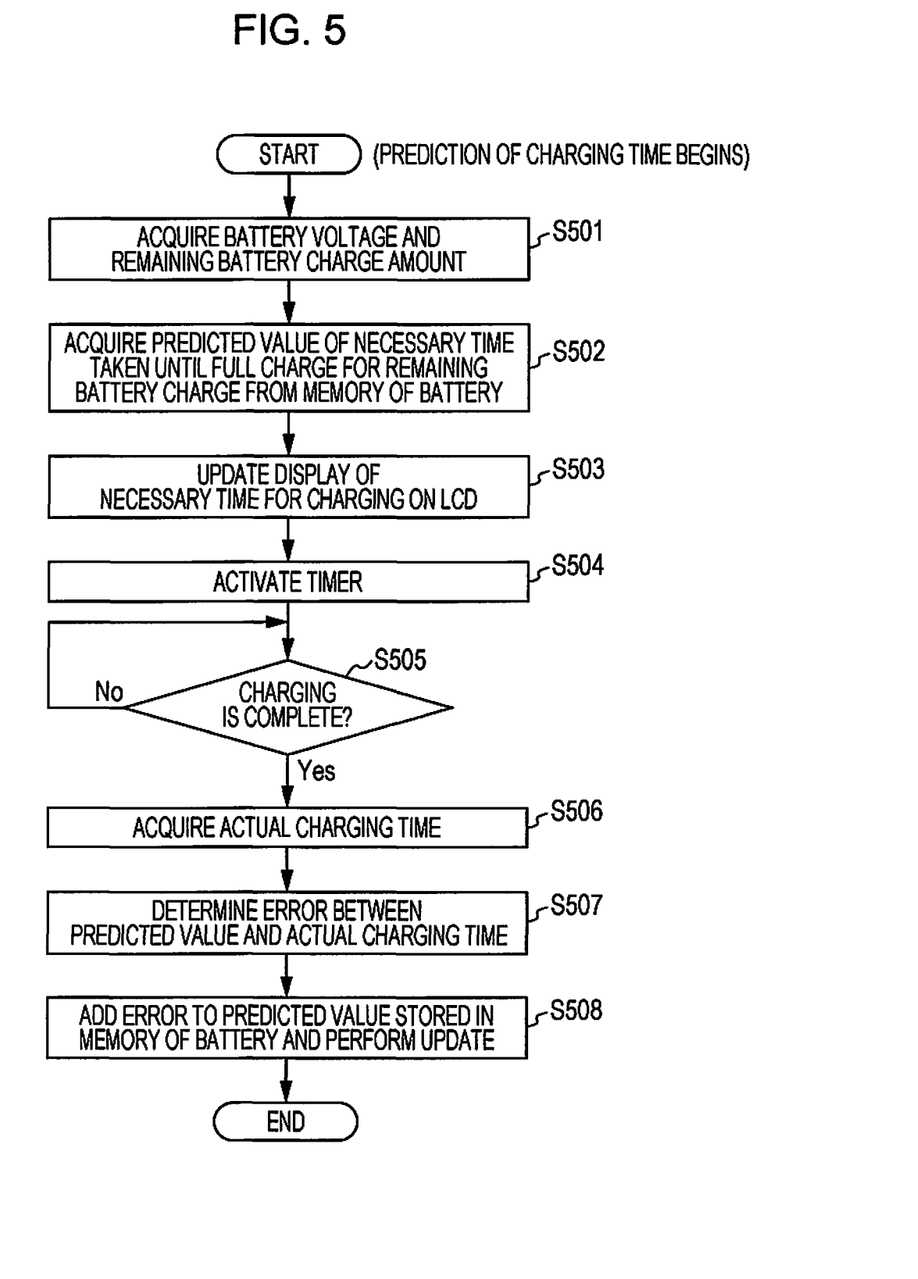
FIG. 5 is a flowchart illustrating a flow of correction of a predicted charging time.
Figure 6:
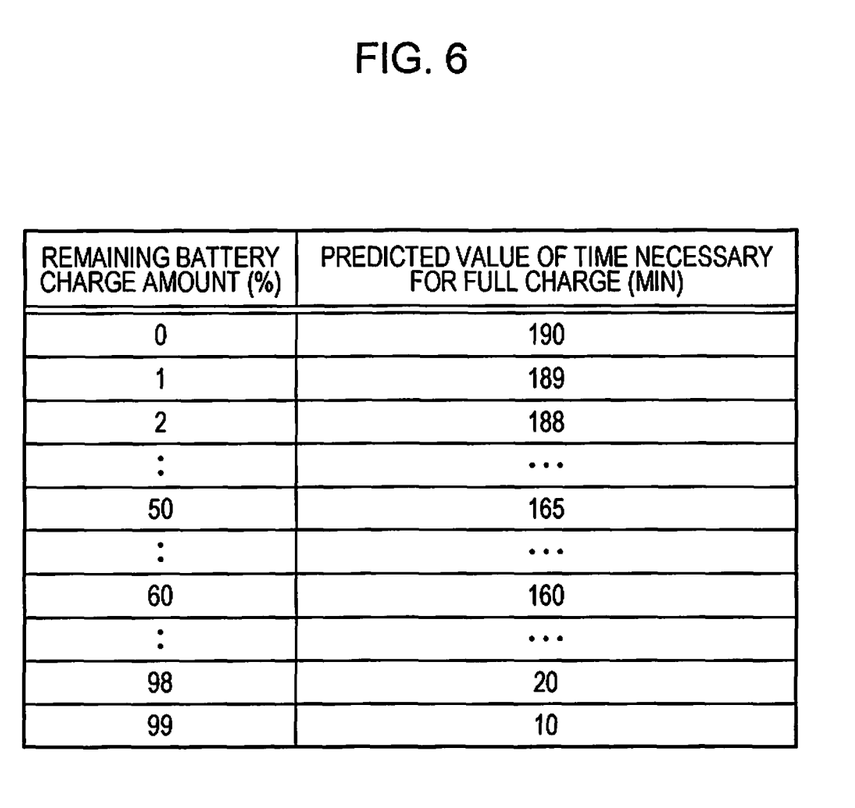
FIG. 6 is a chart illustrating an example of a table for a remaining battery charge amount and a predicted value of the time necessary for a full charge corresponding thereto.

In addition, FIG. 5 is a flowchart illustrating a flow of correction of a predicted charging time, and FIG. 6 is a chart illustrating an example of a table for a remaining battery charge amount and a predicted value of the time necessary for a full charge corresponding thereto.

The overall configuration of the printer 1 will be outlined below with reference to FIG. 1.

The printer 1 externally includes an apparatus main body 3 that includes a carriage 19 with a recording head 21, which is an example of a recording unit, mounted thereon such that the carriage 19 can be reciprocated in the apparatus width direction, a top cover 5 that opens and closes the top of the apparatus main body 3, a front surface cover 7 that opens and closes the front surface of the apparatus main body 3, and a handle 8 provided to be rotatable relative to the apparatus main body 3.

The printer 1 is constructed to be small in consideration of the portability, and the handle 8 is a portion to be held when the printer 1 is carried. The printer 1 also includes a DC jack 27 (FIG. 2) on the apparatus back side and operates on power supplied from an AC adapter 50 (FIG. 2) under the condition where the AC adapter 50 is connected to the DC jack 27. The printer 1 is also configured to obtain power from a battery 23 removable from the apparatus main body 3 and operate on the obtained power, in addition to operating on power supplied from the AC adapter 50.

A paper setting opening 6 through which a recording sheet, an example of a medium, is inserted and set is provided in the rear top of the apparatus main body 3. The top cover 5 is formed to have a size and a shape that enable the entire top surface of the apparatus main body 3 to be covered with the top cover 5, and is rotatably coupled to the rear of the apparatus main body 3. The top cover 5 when closed covers the entire top surface of the apparatus main body 3 including the paper setting opening 6 and a tilt panel 9 described later, and when opened exposes the paper setting opening 6 and the tilt panel 9.

Note that the top cover 5 in an opened state functions as a paper support that supports a recoding sheet to be set in the paper setting opening 6.

The tilt panel 9 includes a power supply button 11, an operation section 13 for performing various operations, a liquid crystal display (LCD) displaying section 15 that performs various types of display, and a charging display LED 17. The LCD displaying section 15 displays information such as various menus, various statuses, and various errors, and, in addition, displays the remaining battery charge amount of the battery 23 in percentage. That is, the LCD displaying section 15 constitutes a remaining charge amount displaying section that displays a remaining battery charge amount.

The charging display LED 17 is illuminated during charging control of the battery 23 (under the condition where the battery is other than in the fully charged state and the AC adapter 50 is connected) and is off when charging control is not performed (under the condition where the AC adapter 50 is not connected, or where the battery is fully charged despite the AC adapter 50 being connected). That is, the charging display LED 17 constitutes a charging displaying section that displays whether charging control is being performed.

The charging control of the battery 23 will be described in more detail later.

The tilt panel 9 can be tilted at least when the upper cover 5 is opened, and is configured to be able to take a state where the tilt panel 9 falls flush with the top surface of the apparatus main body 3 (not illustrated) and a state where the tilt panel 9 is pulled up as illustrated in FIG. 1 such that the LCD displaying section 15 can be easily visually recognized from in front of the apparatus.

The front surface cover 7 that opens and closes the front surface of the apparatus main body 3 is rotatably coupled to the bottom of the front surface of the apparatus main body 3, and, by being closed, closes a paper exit slot (not illustrated) and, by being opened, opens the paper exit slot and functions as a stacker that supports an exiting recording sheet.

Subsequently, with reference to FIG. 2, the configuration of the battery charging apparatus 26 included in the printer 1 will be described.

The battery charging apparatus 26 includes a charging circuit 29 and a control section 31 that controls the charging circuit 29.

In FIG. 2, an arrow denoted by reference characters "PL" followed by a number indicates a power line, and an arrow denoted by a reference character "L" followed by a number indicates a signal line.

Power is supplied from the AC adapter 50 via a power line PL0 to the DC jack 27, and power is supplied from the DC jack 27 via a power line PL1 to the charging circuit 29.

The charging circuit 29 supplies power via a power line PL2 to the battery 23 and also adjusts the voltage value (charging voltage) at this occasion in accordance with the battery voltage.

The control section 31 sends a signal giving an instruction to permit charging or to prohibit charging via a signal line L5 to the charging circuit 29, and the charging circuit 29 sends a signal indicating a charging status via a signal line L4 to the control section 31.

The control section 31 includes a central processing unit (CPU), random access memory (RAM), read-only memory (ROM), and the like, which are not illustrated in the drawings, and reads a program stored in the ROM and performs necessary processing. A remaining charge amount acquiring unit 33, a charging display control unit 35, a remaining charge amount displaying control unit 37, a measuring unit 39, and an information writing unit 41 are all the units implemented by using programs stored in the ROM. Among these units, the charging display control unit 35 switches the charging display LED 17 on and off, and the remaining charge amount displaying control unit 37 controls the display of a remaining battery charge amount on the LCD displaying section 15.

Note that the measuring unit 39 and the information writing unit 41 will be described later.

The control section 31 detects connection of the battery 23, via a signal line L7. The battery 23 includes a voltage detection section and a temperature detection section, which are not illustrated in the drawings, and the control section 31 acquires at least voltage and temperature out of conditions of the battery 23 via a signal line L6.

The remaining charge amount acquiring unit 33 of the control section 31 acquires a remaining charge amount (percentage) of the battery 23 in accordance with the battery voltage acquired from the battery 23. There are a variety of methods to acquire a remaining battery charge amount, and a known acquiring method, such as a method in which the remaining battery charge amount is calculated from a battery voltage based on a predetermined calculation formula or a method in which the remaining battery charge amount is acquired based on table data of remaining battery charge amounts corresponding to battery voltages, may be used.

The battery 23 includes memory 25, which is an example of a storage unit. Table data of predicted values of times necessary for a full charge relative to numerical values of remaining battery charge amounts (FIG. 6) is stored in the memory 25, and the control section 31 reads and updates the table data by using a signal line L8.

With reference to FIG. 3, battery charging control performed by the control section 31 will be described below.

The battery charging control illustrated in FIG. 3 is performed when the AC adapter 50 (FIG. 2) is connected to the DC jack 27 (FIG. 2) and the remaining battery charge amount is in a state other than a full charge (in a state where charging is needed).

Upon connection of the AC adapter 50 (FIG. 2) to the DC jack 27 (FIG. 2) while the battery 23 is in the state where charging is needed, the control section 31 illuminates the charging display LED 17 (step S101).

Subsequently, the control section 31 acquires a battery voltage value and acquires (calculates) a remaining battery charge amount in accordance with the acquired battery voltage value (step S102). The control section 31 then updates the display of the LCD displaying section 15 such that the acquired remaining battery charge amount is displayed on the LCD displaying section 15 (step S103).

Subsequently, upon receiving an instruction for performing charging from the control section 31, the charging circuit 29 starts charging, that is, voltage application of the battery 23 (step S104).

Subsequently, if the remaining battery charge amount is greater than or equal to 99% (Yes in step S105), the process proceeds to step S109. Step S109 and the subsequent steps will be described later.

If the remaining battery charge amount is less than 99% (No in step S105), the process enters a routine to monitor whether a charging time T1 has elapsed (step S106).

The charging time T1 is a predetermined duration and is stored in a storage unit such as ROM or the like included in the control section 31. The charging time T1 is set to, by way of example, a duration of about a few minutes, for example, if the time taken for charging the remaining battery charge amount from 0% to 100% is about a few hours.

That is, the charging circuit 29 repeats short-time charging and stopping of the charging until the battery 23 is fully charged.

In more detail, if the charging time T1 has elapsed (Yes in step S106), charging is temporarily stopped (step S107) and the process enters a monitoring routine to monitor whether a wait time T2 has elapsed (step S108). The wait time T2 is a predetermined duration and is stored in a storage unit such as ROM or the like included in the control section 31. The wait time T2 is set to a duration of about a few seconds, for example, if the charging time T1 is about a few minutes.

If the wait time T2 has elapsed (Yes in step S108), the process returns to step S102, where a battery voltage value is acquired and a remaining battery charge amount is acquired (calculated) in accordance with the acquired battery voltage value. The display of the LCD displaying section 15 is then updated such that the acquired remaining battery charge amount is displayed on the LCD displaying section 15 (step S103), and subsequently the same processing as performed previously is repeated.

That is, the control section 31 (the remaining charge amount acquiring unit 33) does not perform acquisition of a battery voltage value, which is the precondition for acquisition of a remaining battery charge amount, during charging (during application of voltage to the battery 23) but temporarily stops charging (step S107) and performs the acquisition (S102) after a given wait time has elapsed (step S108). Thus, a problem that a battery voltage value is acquired in a situation where the voltage is unstable during charging or immediately after charging and, as a result, an inaccurate remaining battery charge amount is acquired and displayed may be alleviated.

Next, if, in step S105, the remaining battery charge amount has become greater than or equal to 99% (Yes in step S105), the process proceeds to a monitoring routine to monitor whether a full charge has been achieved (step S109). That is, if the remaining battery charge amount is greater than or equal to 99% (if the battery voltage exceeds a given value), the control section 31 continues charging the battery (voltage application) without temporarily stopping charging and waiting for the time to elapse (steps S107 and S108). The reason for this is that when the remaining battery charge amount is greater than or equal to 99%, the voltage value is stable, making it unnecessary to temporarily stop charging and wait for the time to elapse. Thus, an unnecessary increase in charging time may be suppressed.

Note that the monitoring routine in step S109 includes acquisition of a battery voltage and acquisition of a remaining charge amount in accordance therewith (processing similar to that in step S102).

If a full charge has been achieved (Yes in step S109), the control section 31 updates the display of a remaining battery charge amount on the LCD displaying section 15 to 100% (step S110) and subsequently turns off the charging display LED 17 (step S111).

During the duration from a time at which the charging display LED 17 is illuminated in step S101 to a time at which the charging display LED 17 is turned off based on a full charge in step S110, the control section 31 (the charging display control unit 35) does not temporarily turn off the charging display LED 17 despite the temporary stopping of charging (step S107), causing the charging display LED 17 to continuously display that charging control is being performed.

Thus, suitable charging status display, which does not lead to frequent changes in the status of the charging display LED 17, may be performed.

Modifications of Embodiment

The embodiment described above may be modified as described below.

(1) The charging time T1 in step S106 may be changed in accordance with battery voltage. Adjustment of the charging time T1 becomes synonymous with adjustment of a time interval in which information about the display of a remaining battery charge amount on the LCD displaying section 15 is updated.

For example, when the charging time T1 is increased for the case of a low battery voltage, the remaining battery charge amount appears to rise straight at a time when the remaining battery charge amount display on the LCD displaying section 15 is updated. This is not desirable. Accordingly, the charging time T1 be decreased with a decrease in battery voltage. This enables the display of a remaining battery charge amount to be finely updated in the condition where the remaining battery charge amount largely varies, which may serve the convenience of the user.

In such a case, the charging time T1 may be set for each of ranges into which the battery voltage range is divided, or, by using a predetermined calculation formula, the charging time T1 may be set to gradually increase with an increase in battery voltage.

(2) As illustrated in step S109 in FIG. 3, in the above embodiment, when the remaining battery charge amount is greater than or equal to 99% (when the battery voltage exceeds the given value), battery charging (voltage application) continues without temporary stopping of charging and waiting for the wait time T2 to elapse (steps S107 and S108), that is, the wait time T2 is set to zero; however, the wait time T2 may be adjusted finely in accordance with the battery voltage.

Specifically, the lower the battery voltage, the longer time is taken until the voltage is stabilized upon stopping of charging (step S107 in FIG. 3), and therefore the lower the battery voltage, the longer the wait time T2 is set.

In this case, in a similar manner as mentioned above, the wait time T2 may be set for each of ranges into which the battery voltage range is divided, or, by using a predetermined calculation formula, the wait time T2 may be set to gradually decrease with an increase in battery voltage.

(3) When the LCD displaying section 15 has a configuration in which is active a power saving mode in which, for example, the backlight is turned off or the entirety thereof including the display is turned off, the control section 31 (the remaining charge amount acquiring unit 33) may perform control so as not to temporarily stop charging and wait for the wait time T2 during charging control to elapse (steps S107 and S108 in FIG. 3) while the power-saving mode is active. Alternatively, the wait time T2 (step S108 in FIG. 3) may be shorter than in the case where the power-saving mode mentioned above is deactivated.

Thus, the wait time T2 is not provided in the case of the power-saving mode in which a remaining battery charge amount need not be displayed, which may suppress an unnecessary increase in charging time.

Note that the printer 1 includes an interface, which is not illustrated in the drawings, connected to an external device (for example, a computer), which is not illustrated in the drawings. When the printer 1 is connected to an external device, the remaining battery charge amount is sometimes confirmed via a printer driver that operates on the external device side. In such a case, even when the LCD displaying section 15 proceeds to the power-saving mode, it is desirable to provide temporary stopping of charging and waiting for the wait time T2 during charging control to elapse (steps S107 and S108 in FIG. 3) in order to accurately grasp the remaining battery charge amount on the external device side.

(4) The remaining charge amount displaying control unit 37 of the control section 31 may cause the display of a remaining battery charge amount on the LCD displaying section 15 to be consistently in either an increasing direction or a decreasing direction in accordance with the apparatus state, regardless of the remaining battery charge amount acquired by the remaining charge amount acquiring unit 33.

For example, during operation of the apparatus, that is, during discharging of the battery, the battery voltage drops because of the influence of discharging, and, after the operation of the apparatus stops, that is, the battery discharging is complete, the battery voltage rises. Accordingly, when the remaining battery charge amount is acquired during battery discharging and is displayed, and the remaining battery charge amount is then acquired after completion of the battery discharging and is displayed, there is an increase in the displayed remaining battery charge amount because of a temporary voltage variation despite the state where the battery is not charged. This is not intuitive to the user.

To address this, as described above, the remaining charge amount displaying control unit 37 of the control section 31 causes the display of a remaining battery charge amount on the LCD displaying section 15 to be consistently in either an increasing direction or a decreasing direction in accordance with the apparatus state, regardless of the remaining battery charge amount acquired by the remaining charge amount acquiring unit 33.

Causing the remaining battery charge amount to be consistently in either an increasing direction or a decreasing direction in accordance with the apparatus state makes it possible to suppress unnatural display of an increase or decrease in remaining battery charge amount contrary to the apparatus state as described above to provide a natural display of a remaining battery charge amount.

FIG. 4 illustrates an example of the above, where, while an apparatus is driven by a battery, the display of a remaining battery charge amount is consistently in a decreasing direction when the apparatus state is that the apparatus is in operation (for example, printing is being performed), and the display of a remaining battery charge amount is also consistently in a decreasing direction when the apparatus state is that the apparatus is at rest. That is, while the apparatus is driven by a battery, the display of a remaining battery charge amount is consistently in a decreasing direction regardless of how the apparatus state is. For example, if 70% is acquired as the numerical value of a remaining battery charge amount during operation of the apparatus, and 72% is acquired as the numerical value of a remaining battery charge amount after completion of operation of the apparatus, 70% is displayed as the numerical value of a remaining battery charge amount on the LCD displaying section 15. Thus, unnatural display is suppressed, for example, when, although the apparatus is not being charged, the remaining battery charge amount increases after operation of the apparatus has stopped.

In addition, while the AC adapter is connected, the display of a remaining battery charge amount is consistently in an increasing direction when the apparatus state is that the apparatus is in operation (for example, printing is being performed), and the display of a remaining battery charge amount is also consistently in an increasing direction when the apparatus state is that the apparatus is at rest. That is, while the AC adapter is connected, the display of a remaining battery charge amount is consistently in an increasing direction regardless of how the apparatus state is. Thus, the situation where the displayed remaining battery charge amount decreases because of a temporary voltage variation and is not intuitive to the user may be alleviated.

The above-described display of a remaining battery charge amount consistently in an increasing direction may be applied to, for example, the processing in step S103 in battery charging control described with reference to FIG. 3.

The remaining charge amount displaying control unit 37 controls a remaining battery charge amount displayed on the LCD displaying section 15 as described above.

Note that the remaining battery charge amount displayed on the LCD displaying section 15 is not necessarily limited to being displayed in percentage and may be displayed by another display method, for example, a method of graphically displaying a remaining battery charge amount. In addition, a parameter substantially equivalent to the remaining battery charge amount, such as a remaining available time, may be displayed.

Correction of Predicted Charging Time

Subsequently, with reference to FIG. 5 and FIG. 6, correction of a predicted value of the time necessary for a full charge will be described.

The LCD displaying section 15 may be configured to display the time necessary for a full charge (an expected time) in charging, in addition to the remaining battery charge amount. As the necessary time for a full charge, by way of example, under the condition that table data of remaining battery charge amounts and predicted values of necessary times corresponding thereto as illustrated in FIG. 6 is stored in the memory 25 of the battery 23, data is read as the need arises, and the read predicted value of a necessary time can be displayed on the LCD displaying section 15.

The reading and displaying of data can be performed simultaneously with, for example, processing in steps S102 and S103 in FIG. 2.

Here, typically, regarding the table data illustrated in FIG. 6, the same table data may be used for batteries if the batteries has the same specifications; however, because of individual variations among batteries, the predicted time for completion of charging sometimes differs from a time actually taken for charging of a battery. It is conceivable to correct the predicted time taken for completion of charging by using the time actually taken for charging. However, such correction is incapable of dealing with a usage situation where, for example, a plurality of batteries are prepared and are used alternately.

To address this, the printer 1 according to the present embodiment includes the measuring unit 39 that measures an actual charging time taken until the remaining battery charge amount increases by a given amount, and the information writing unit 41 that writes information about the actual charging time to the memory 25, which is an information storage section included in the battery 23.

Control of correction of a predicted charging time illustrated in FIG. 5 may be performed, for example, in parallel with charging control described with reference to FIG. 2 or may be performed in such a manner that this correction is incorporated into the charging control described with reference to FIG. 2.

With reference to FIG. 5, a battery voltage is acquired and, in accordance therewith, a remaining charge amount is acquired (step S501), and a predicted value of the necessary time for a full charge for the remaining battery charge amont is acquired from the memory 25 of the battery 23 (step S502).

Next, the display of a necessary time for charging on the LCD displaying section 15 is updated (step S503) and a timer is activated (step S504). The timer is intended to measure an actual time necessary from start of charging to completion of charging (full charge) in this embodiment and corresponds to the measuring unit 39 in FIG. 2.

If charging is complete (Yes in step S505), an actual charging time is acquired (step S506) and an error between a predicted value of the necessary time and the actual charging time is determined (step S507). Based on the acquired error, the table data in FIG. 6 stored in the memory 25 of the battery 23 is updated (step S508). That is, performing the processing in step S508 achieves functions of the information writing unit 41.

For example, if the remaining battery charge amount is 50% at the time when charging starts, the predicted value of the time necessary for a full charge is 165 minutes in the example in FIG. 6. However, when, in reality, it takes 132 minutes for a full charge, the actual charging time is 80% of the predicted value. Therefore, all of the predicted values of necessary times in the table illustrated in FIG. 6 are multiplied by a factor of 0.8, and the table data is updated to the obtained values.

Thus, even when a battery is replaced, acquiring the necessary time for charging for the replaced battery from the memory 25 enables a more accurate necessary time for charging (predicted time) adaptive for an individual battery to be provided to the user.

Note that the foregoing correction of a predicted value of the necessary time for a full charge may be modified as follows.

(1) In consideration of a battery temperature, a plural pieces of table data may be stored for battery temperatures, respectively.

(2) Update of table data is not performed by multiplication of each data by an error count value, but may just reflect a time actually measured. That is, in the example in FIG. 6, the actual charging time, which is a time actually taken, is measured each time the remaining battery charge amount increases by 1%, and the measured time may be written as is.

(3) The display of the time necessary for a full charge on the LCD displaying section 15 indicates a time obtained by reference to table data after the battery voltage value and the remaining charge amount are acquired. Instead, after the time necessary for a full charge is first acquired, for example, a minute-by-minute or second-by-second countdown of the acquired time may be displayed.

The entire disclosure of Japanese Patent Application No. 2017-029190, filed Feb. 20, 2017 is expressly incorporated by reference herein.

What is claimed is:
1. A battery charging apparatus comprising:
 a charging circuit that charges a battery;
 a remaining charge amount displaying section that displays a remaining battery charge amount;
 a charging displaying section that displays a charging display indicative of whether at least charging control is being performed, the charging control includes a series of control operations from start of charging to completion of charging, the series of control operations repeatedly and alternately including charging of the battery by the charging circuit for a predetermined charging time and a temporary stopping of the charging of the battery by the charging circuit for a predetermined stop time;
 a remaining charge amount acquiring unit that acquires a remaining battery charge amount to be displayed on the remaining charge amount displaying section in accordance with a battery voltage; and
 a charging display control unit that switches between an ON state and an OFF state of the charging display displayed in the charging displaying section,
 wherein the remaining charge amount acquiring unit acquires the remaining battery charge amount by detecting the battery voltage after a given wait time has elapsed from start of the temporary stopping of the charging of the battery by the charging circuit, and
 the charging display control unit continuously maintains the ON state of the charging display to avoid a state change of the charging display while the charging control is being performed such that
  the charging display control unit continuously maintains the ON state of the charging display in the charging displaying section during the charging of the battery by the charging circuit while the charging control is being performed, and
  the charging display control unit continuously maintains the ON state of the charging display in the charging display section during the temporary stopping of the charging by the charging circuit while the charging control is being performed.
2. The battery charging apparatus according to claim 1, wherein the lower the battery voltage, the shorter a time interval in which information of the remaining charge amount displaying section is updated is set.
3. The battery charging apparatus according to claim 1, wherein the charging displaying section is capable of performing a power saving mode in which display of at least a remaining battery charge amount is turned off, and wherein the remaining charge amount acquiring unit does not provide the wait time or sets the wait time to be shorter than when the power saving mode is deactivated, while the power saving mode is being performed.

4. The battery charging apparatus according to claim 1, wherein the remaining charge amount acquiring unit does not provide the wait time when the battery voltage exceeds a given value.

5. The battery charging apparatus according to claim 1, further comprising a remaining charge amount displaying control unit that controls the remaining charge amount displaying section in accordance with a remaining battery charge amount acquired by the remaining charge amount acquiring unit, wherein the remaining charge amount displaying control unit causes a remaining battery charge amount displayed on the remaining charge amount displaying section to be consistently in either an increasing direction or a decreasing direction in accordance with an apparatus state, regardless of the remaining battery charge amount acquired by the remaining charge amount acquiring unit.

6. The battery charging apparatus according to claim 1, further comprising a measuring unit that measures an actual charging time taken for increasing a remaining battery charge amount by a given amount; and an information writing unit that writes information regarding the actual charging time to an information storage section included in the battery.

7. A recording apparatus comprising:

a recording unit that performs recording on a medium; and the battery charging apparatus according to claim 1.

8. The battery charging apparatus according to claim 1, wherein the charging control is continuously performed during a period in which the charging circuit is connected to a power source and in which the remaining battery charge amount is in a state other than a full charge.

9. A battery charging apparatus comprising:

a charging circuit that charges a battery;

a remaining charge amount displaying section that displays a remaining battery charge amount, the remaining charge amount displaying section including a liquid crystal display;

a charging displaying section that displays a charging display indicative of whether at least charging control is being performed, the charging control includes a series of control operations from start of charging to completion of charging, including charging of the battery by the charging circuit and a temporary stopping of charging;

a remaining charge amount acquiring unit that acquires a remaining battery charge amount to be displayed on the liquid crystal display in accordance with a battery voltage; and a control unit that switches between an ON state and an OFF state of the charging display displayed in the charging displaying section, wherein the remaining charge amount acquiring unit acquires the remaining battery charge amount by detecting the battery voltage after charging of the battery by the charging circuit has been temporarily stopped and a given wait time has elapsed, the control unit continuously maintains the ON state of the charging display in the charging displaying section during the charging of the battery by the charging circuit while the charging control is being performed, the control unit continuously maintains the ON state of the charging display in the charging displaying section during the temporary stopping of charging while the charging control is being performed, and in the ON state of the charging display in the charging displaying section, the control unit displays the remaining battery charge amount from 0% to 100% and illuminates a charging display LED.

10. The battery charging apparatus according to claim 9, wherein when the remaining battery charge amount is greater than or equal to 99%, the control unit continues the charging of the battery without the temporary stopping of charging and waiting for the wait time to elapse.

11. The battery charging apparatus according to claim 9, wherein when the liquid crystal display has a power saving mode, the remaining charge amount acquiring unit performs control so as not to temporarily stop charging and wait for the wait time to elapse during the charging control, and the power saving mode includes a configuration in which a backlight of the liquid crystal display or an entirety thereof is turned off.

* * * * *